United States Patent [19]

Van Zandt

[11] 4,112,873
[45] Sep. 12, 1978

[54] ANIMAL CLIMBING STRUCTURE KIT

[76] Inventor: Robert D. Van Zandt, 611 Kennon St., Middletown, R.I. 02840

[21] Appl. No.: 756,899

[22] Filed: Jan. 5, 1977

[51] Int. Cl.$^2$ .............................................. A01K 29/00
[52] U.S. Cl. ..................................................... 119/29
[58] Field of Search ................. 119/29, 1; 272/61, 62, 272/63, 64

[56] References Cited

U.S. PATENT DOCUMENTS

| 243,456 | 6/1881 | Medart | 272/64 |
|---|---|---|---|
| 3,159,141 | 12/1964 | Paterek | 119/29 |
| 3,595,209 | 7/1971 | Parker | 119/29 |

*Primary Examiner*—Hugh R. Chamblee
*Attorney, Agent, or Firm*—Berman, Aisenberg & Platt

[57] ABSTRACT

A kit for the assembly of an animal climbing structure includes a pair of base members having rod-like support elements projecting upwardly therefrom. A column member is adapted to be supported by one end thereof on one of the base members and has blind bores in such end adapted to accommodate therein the rod-like support elements of the base member. The opposed end of the column member has at least one blind bore therein. An elongated beam member covered with a carpet material has at least one rod-like support element in a face which is cooperable with a corresponding blind bore in the opposed end of the column member. The beam member also is provided with blind bores adjacent its other end cooperable with the rod-like support elements of the other base member. Preferably axially spaced intermediate blind bores are formed in the beam member between its ends and a dowel member is provided which is positionable in a selected one of the intermediate blind bores of the beam member and in a selected one of the blind bores of the opposed end of the column member to thereby vary the angle of inclination of the beam member as desired.

5 Claims, 6 Drawing Figures

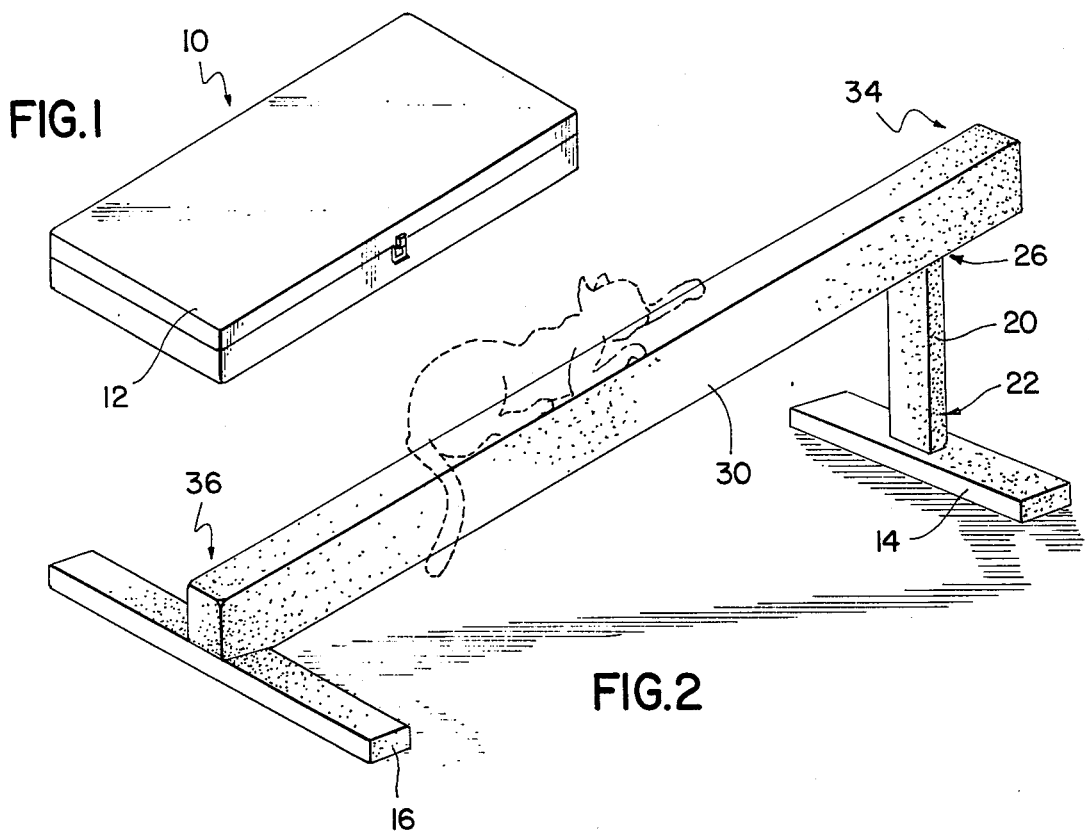
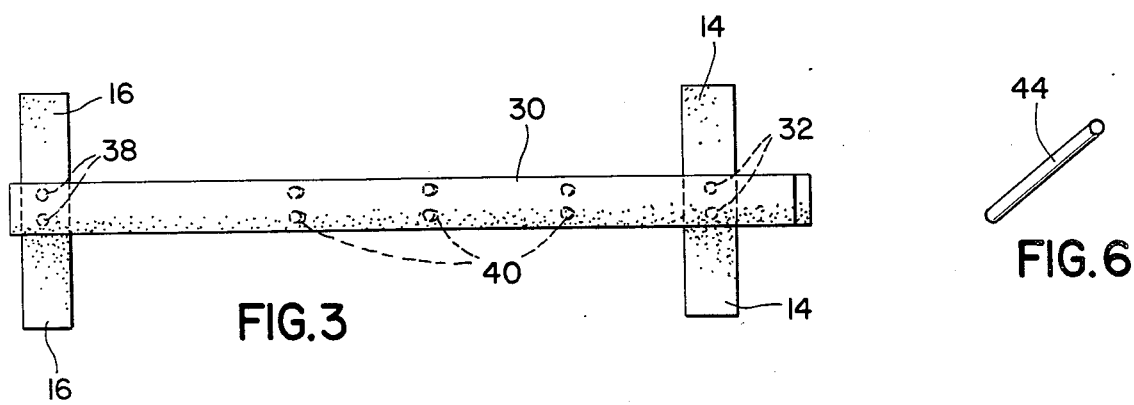
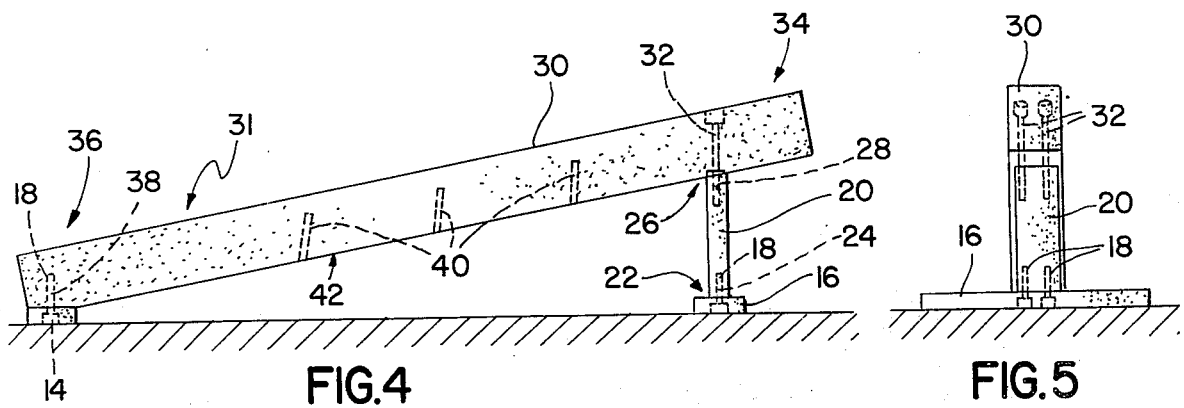

ANIMAL CLIMBING STRUCTURE KIT

BACKGROUND OF THE INVENTION

The present invention relates to a kit for the assembly of an animal climbing structure.

Animal climbing structures have been known heretofore, such structures having been devised to satisfy the need of domesticated animals to climb and to sharpen their claws. Generally, such devices are in permanently assembled relation and have a single spatial disposition. Although such prior devices may be portable they cannot except with great inconvenience, be moved from one household to another for use by the animal when such animal is taken by its owners to someone else's home as during a visit. Typical of the prior devices available is the filing post disclosed in U.S. Pat. No. 2,997,019 issued Aug. 22, 1961 to J. S. Bryson and the animal climbing structure disclosed in U.S. Pat. No. 3,479,991 issued Nov. 25, 1969 to W. J. Lichtenberger. It would be desirable to have a structure which can be readily assembled and disassembled so as to be portable from one household to another and which can be assembled in a plurality of different spatial relationships thus affording variety for the animal so as to maintain its interest and also accommodating animals of various sizes.

SUMMARY OF THE INVENTION

It is one object of the invention to provide a kit for the assembly of an animal climbing structure which affords ease of assembly and disassembly.

It is another object of the invention to provide a kit for the assembly of an animal climbing structure which enables erection of the components in such manner as to afford a variety of spatial relationships.

Other objects and advantages of the invention will become readily apparent from the following description of the invention.

According to the present invention there is provided a kit for the assembly of an animal climbing structure comprising: a pair of base members each having at least one rod-like support element projecting upwardly therefrom; a column member adapted to be supported by one end thereof atop one of the base members and provided with blind bores in the one end adapted to accommodate therein the rod-like support elements of the one base member, at least one blind bore being provided in the opposed end of the column member; and an elongated beam member covered with a carpet material and having at least one rod-like support element projecting downwardly therefrom adjacent one end thereof adapted to be positioned within the corresponding blind bores in said opposed end of said column member and blind bores adjacent the other end thereof adapted to accommodate therein the rod-like support elements of the other of the base members.

BRIEF DESCRIPTION OF THE DRAWING

In order that the invention may be more fully comprehended it will now be described, by way of example, with reference to the accompanying drawings, in which:

FIG. 1 is a perspective view of the container of the kit of the invention within which the component elements may be housed either for storage or for transport:

FIG. 2 is a perspective view of the animal climbing structure in erected relation;

FIG. 3 is a top plan view of the structure shown in FIG. 2;

FIG. 4 is a side elevational view of the climbing structure shown in FIG. 2;

FIG. 5 is a right hand end view of the climbing structure shown in FIG. 2; and

FIG. 6 is a perspective view of a dowel member which can be employed to vary the angle of inclination of the beam member as desired.

DETAILED DESCRIPTION OF THE INVENTION

Referring to the drawings there is shown a kit, indicated generally by reference numeral 10, which is adapted to erect an animal climbing structure utilizable by dogs, cats, monkeys and other domesticated animals which exhibit a desire for climbing. FIG. 1 depicts a case 12 within which the various structural components may be housed. Since the beam member to be described is the longest of the components, and is desirably approximately 3 feet to 42 inches in length, the overall length of the case should be adequate to contain such beam member.

The structural members include a pair of base members 14, 16 which preferably are elongated so as to provide proper bearing support for the other elements to be mounted thereon. Each of such base members is given at least one, and preferably a pair of, rod-like support elements 18. The support elements project upwardly from the respective base members and may be in the form of dowel members.

The kit includes a column member 20 which is configured at one end 22 so as to repose upon one of the base members. One or more, preferably a pair of blind bores 24 are formed in end 22 and are dimensioned to accommodate therein the support elements 18 of the base member. A secure but releasable joint is thus formed between base member 14 and column member 20 which will withstand the stresses which may be expected to develop during use of the climbing structure by the animal. The opposed end 26 of the column member is provided with at least one, and preferably a pair of blind bores 28 for a purpose to be described.

An elongated beam member 30 is provided for disposition atop the column member and base member 16 as shown in FIG. 2. The beam member is covered with a carpet material 31, preferably a non-loop pile material. At least one rod-like support element 32, similar in construction to the support elements 18 of the base members, is provided adjacent one end 34 of the beam member. The number and dimensions of the support elements 32 should be selected in accordance with the number and dimensioning of blind bores 28 of the column member such that the releasable connection between the beam and column member is secure as is the joint between the column member and base member. The other end 36 of the beam member is given blind bores 38 which correspond in number and dimension with the upwardly projecting support elements 18 of base member 16. The joint thus provided between the beam and base members is releasable and secure as are the joints described between the column member and beam and between the column member and base member 14. Desirably the dimensioning of all the blind bores and rod-like support elements is such as to provide a snug fit.

In the preferred embodiment of the invention, the beam member is provided with a series of axially spaced intermediate blind bores 40 in its lower face 42. A dowel member 44 is also included in the kit and is dimensioned so as to be positionable at its opposed ends respectively, within a selected one of the intermediate blind bores 40 and within one of blind bores 24 in the column member. It will thus be appreciated that selection of an appropriate intermediate blind bore 40 will establish the angle of inclination of the beam member. The base member 14 would then be shifted beneath the beam so that the selected blind bore 24 is vertically aligned with the selected blind bore 40.

It is contemplated that the base members, column member and beam member be constructed of wood. Amongst the preferred woods are white pine, fir and redwood. Considerations such as weight will dictate the particular wood to be used. However, it is also within the ambit of the invention to mold one or more of such elements from one of the commercially available synthetic plastics materials. The dowel member 44 may be similarly provided in either wood or molded synthetic plastics material. The carpet material may be any suitable durable non-loop material and may be secured to the beam member by an adhesive material or by means of upholstery nails whichever is deemed most expedient. Indoor-outdoor carpet has been found to be eminently satisfactory.

As shown most clearly in FIG. 4, the lower face of the beam at end 36 may be given a chamfer to afford improved seating on base member 16.

While a specific embodiment of an animal climbing structure kit has been disclosed in the foregoing description it will be understood that various modifications within the spirit of the invention may occur to those skilled in the art. Therefore, it is intended that no limitations be placed on the invention except as defined by the scope of the appended claims.

I claim:

1. A kit for the assembly of an animal climbing structure comprising:

a pair of base members each having at least one rod-like support element projecting upwardly therefrom;

a column member adapted to be supported at one end thereof atop one of said base members and provided with at least one blind bore in said one end adapted to accomodate therein said at least one rod-like support element of one of said base members and at least one blind bore being provided in the other end of said column member;

and an elongated beam member covered with a carpet material and having at least one rod-like support element projecting downwardly therefrom adjacent one end thereof adapted to be positioned within the corresponding blind bore in said other end of said column member and at least one blind bore adjacent the other end thereof adapted to accomodate therein said at least one rod-like support element of the other of said base members.

2. A kit according to claim 1, wherein said beam member is provided with at least one additional intermediate blind bore therein located in axially spaced relation intermediate said at least one support element and said at least one blind bore adjacent the ends thereof, and including a dowel member adapted to have one end thereof positioned within said at least one intermediate blind bore and the other end thereof positioned within said at least one blind bore in said other end of said column member.

3. A kit according to claim 1, wherein said at least one blind bore and said at least one rod-like support element project from the same face of said beam member.

4. A kit according to claim 1, wherein a pair of said rod-like support elements are provided in each of said base members.

5. A kit according to claim 1, wherein said carpet material comprises a non-loop pile material.

* * * * *